US007092907B2

(12) United States Patent
Kanevsky et al.

(10) Patent No.: US 7,092,907 B2
(45) Date of Patent: Aug. 15, 2006

(54) SYSTEM AND METHOD FOR SOFTWARE SELLING

(75) Inventors: Dimitri Kanevsky, Ossining, NY (US); Clifford A. Pickover, Yorktown Heights, NY (US); Mariusz Sabath, Scarsdale, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 09/777,077

(22) Filed: Feb. 5, 2001

(65) Prior Publication Data

US 2002/0107750 A1 Aug. 8, 2002

(51) Int. Cl.
*G06Q 99/00* (2006.01)
*G06F 9/44* (2006.01)

(52) U.S. Cl. .......................................... 705/51; 705/59

(58) Field of Classification Search ................ 705/25, 705/51, 59, 26, 27; 717/168, 169, 170, 171, 717/172, 173, 127, 130, 131
See application file for complete search history.

(56) References Cited

U.S. PATENT DOCUMENTS

| | | | | |
|---|---|---|---|---|
| 5,014,234 A | * | 5/1991 | Edwards, Jr. ................. | 726/33 |
| 5,442,645 A | * | 8/1995 | Ugon et al. .................. | 714/736 |
| 5,708,709 A | * | 1/1998 | Rose ............................. | 705/59 |
| 5,883,954 A | * | 3/1999 | Ronning ....................... | 705/52 |
| 6,041,316 A | * | 3/2000 | Allen ........................... | 705/52 |
| 6,044,471 A | * | 3/2000 | Colvin ......................... | 726/28 |
| 6,354,839 B1 | * | 3/2002 | Schmidt et al. ............. | 434/113 |
| 6,459,364 B1 | * | 10/2002 | Gupta .................... | 340/407.1 |
| 6,469,239 B1 | * | 10/2002 | Fukuda ......................... | 84/602 |
| 6,587,881 B1 | * | 7/2003 | Agarwal et al. ............ | 709/225 |
| 2002/0081229 A1 | * | 6/2002 | Boyd et al. .................... | 422/5 |
| 2003/0088515 A1 | * | 5/2003 | Cooper et al. ................ | 705/50 |

FOREIGN PATENT DOCUMENTS

JP     10-275186 A   *   10/1998

OTHER PUBLICATIONS

"What the customer can do about software disabling devices," Stephen M Goldberg. Practical Lawyer. Philadelphia, Apr. 1999, vol. 45, Iss. 3, p. 71.*
Anon., "Preview Software Announces New Client/Server Technology for Its TimeLOCK Electronic Software Distribution System," Business Wire, p. 04020117, Apr. 2, 1997.*

(Continued)

*Primary Examiner*—Nicholas D. Rosen
(74) *Attorney, Agent, or Firm*—Scully, Scott, Murphy & Presser, P.C.; Daniel P. Morris, Esq.

(57) ABSTRACT

Methods and system to progressively degrade a trial version of software products in various ways so as to permit the user to continue to use the product until the user becomes reliant on the product and becomes so frustrated that the user purchases the product. This approach, it may be noted, is also useful for discouraging illegal use of software without proper licenses. The trial or demonstration version of the software program may degrade in any one or more of a number of ways. For instance, the brightness may fade, the application window may shrink, the font may degrade, features may drop out, the display quality may degrade, the sound quality may diminish, the processing speed may decrease, or the network bandwidth may decrease.

22 Claims, 4 Drawing Sheets

OTHER PUBLICATIONS

Anon., "Eighteen Software Publishers Will Use IBM's CD Showcase," Tape-Disc Business, vol. 8, No. 8, p. 22, Apr. 1994.*

Hatley, R., "Shareware That's Fair and Square; Buzzwords," Times of London, Jun. 26, 1996.*

Langberg, M., "San Jose Mercury News, Calif., Technology Testdrive Column," Knight-Ridder Tribune Business News, May 31, 2001.*

* cited by examiner

SYSTEM AND METHOD FOR SOFTWARE SELLING

BACKGROUND OF THE INVENTION

This invention generally relates to methods and systems for selling software applications. More specifically, the invention relates to methods and systems for encouraging users to purchase software applications after being provided with trial or demonstration versions or samples of the applications.

Companies often make programs for evaluation purposes. Such software applications may be run on a computer, kiosk, web-TV, or other device. Often, such applications display text and images in windows on monitors and provide graphical user interfaces with which users interact with the applications. Typical applications include text and image editors, mail systems, web browsers, financial programs, games, drawing programs, music players, and various office application software. The software vendor may send the programs to consumers for free. Consumers can download programs from the Internet or load them on to their computers from a CD, and the consumers can use the programs during a certain period of time.

Most of the time, the programs have expiration dates beyond which consumers cannot use the programs. For example, a user may be able to download a program such as a text editor and use it for one month until the program expires. Close to the end of the expiration period, the program starts to send a warning message to the user, informing the user that he needs to buy the licensed version of the program, otherwise the program will expire. If the user does not buy the program, the demo program will stop working after the evaluation period. Also, the user can buy a software key (typically a code) that will remove the expiration date and allow the program to continue to work.

This approach is often problematic. When the program stops working, the user often decides to find another company that makes a similar program with similar functionality. Often, the person goes back to the vender's web site, again downloads the demo version of the program, and uses it for another month until it too expires, without ever buying the program.

A current challenge to manufacturers is to determine ways to encourage users to buy the trial products. Manufacturers need methods that are more effective than simply suddenly stopping the use of the product.

SUMMARY OF THE INVENTION

An object of this invention is to improve systems and methods for selling software.

Another object of the present invention is to encourage consumers to purchase software applications after being given a free trial or demonstration version or sample of the application.

A further object of the invention is to control the appearance and performance of a software application.

Another object of this invention is to progressively degrade a trial or demonstration version of a software program in a manner that still permits use of the trial or demonstration version while encouraging the user to purchase the software program.

These and other objects are attained with methods and system to progressively degrade a trial version of the product in various ways so as to permit the user to continue to use the product until the user becomes reliant on the product and becomes so frustrated that the user purchases the product. This approach, it may be noted, is also useful for discouraging illegal use of software without proper licenses.

The trial or demonstration version of the software program may degrade in any one or more of a number of ways. For instance, the brightness may fade, the application window may shrink, the font may degrade, features may drop out, the display quality may degrade, the sound quality may diminish, the processing speed may decrease, or the network bandwidth may decrease.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
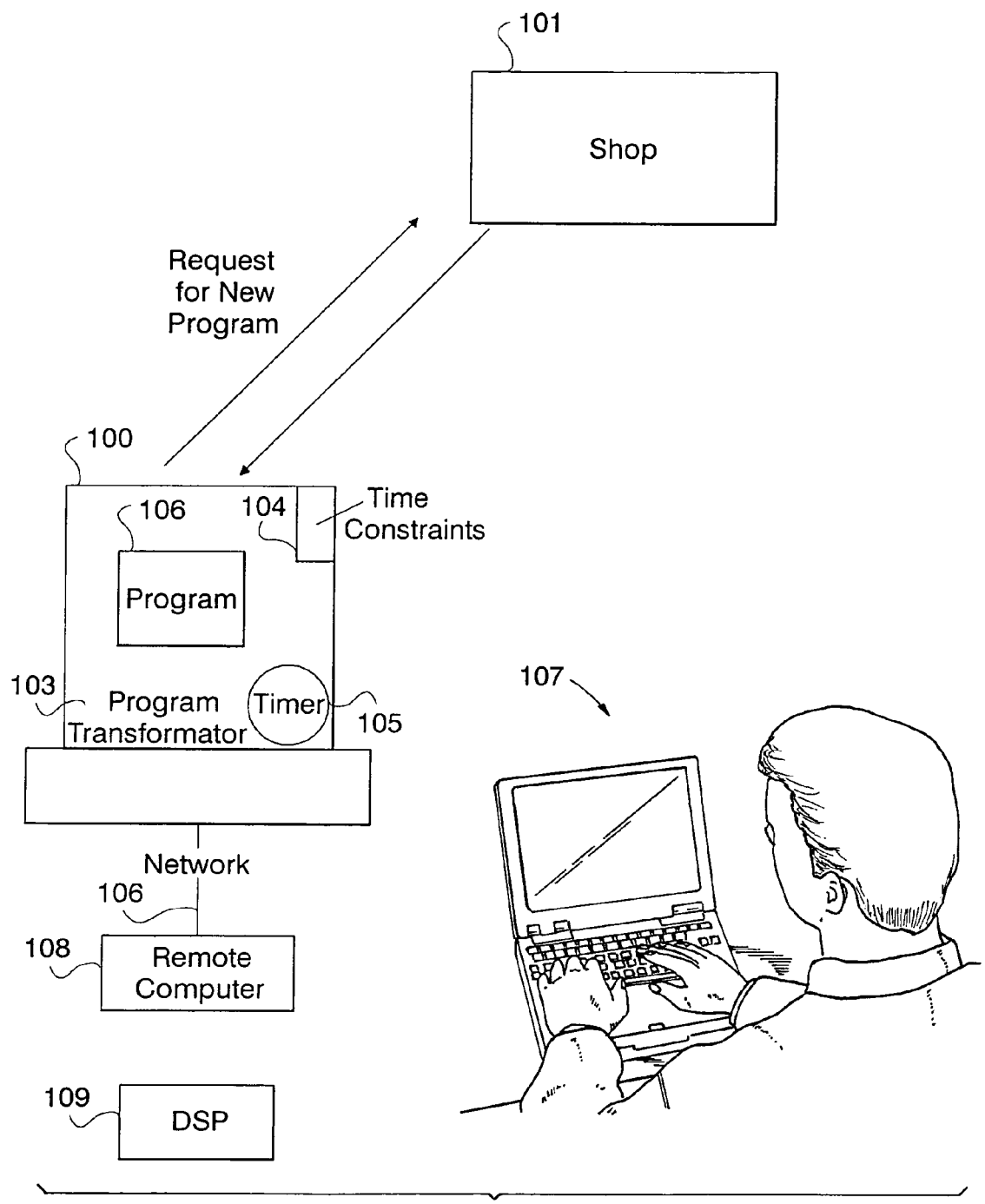
FIG. 1 is an illustrative example of this invention.

As discussed above, companies often make software programs available for evaluation purposes. Such software applications may be run on a computer, kiosk, web-TV, or other device. Often, such applications display text and images in windows on monitors and provide graphical user interfaces with which users interact with the applications. Typical applications include text and image editors, mail systems, web browsers, financial programs, games, drawing programs, music players, and various office application software.

In accordance with the present invention a trial or demonstration version or sample of the program is provided with means to diminish or decrease the quality of the program over time. The software program may be gradually degraded in any one or more of a number of ways. For example, 1) The brightness fades so that it is harder for the user to use the software tool as time progresses. This is the user's inducement to pay for the license, registration code, or actual software. 2) The application window shrinks through time. 3) The font degrades. 4) Features gradually drop out. 5) Display quality (spatial resolution, color resolution, display refresh rate) degrades. 6) Sound quality degrades. 7) Processing speed degrades. 8) Network bandwidth degrades. 9) Unpleasant visual and auditory stimulus is produced. For examples, watermarks may be superimposed and become progressively more opaque; blinking, interfering photographs may be shown. 10) Information degrades (for text, some letters are progressively omitted, words are progressively omitted, some sentences are progressively omitted, some document sections are progressively omitted. For application with sound, sound sections are progressively omitted. Random omissions may also be performed.

For example, after thirty days, the application may be 90% as bright as it was originally, and after sixty days the application may be 80% as bright. This is the user's inducement to pay for the license, registration code, and/or fully-functioning software. Similarly, the application window may shrink in size through time. The font may degrade through time. For example, pieces of letters may progressively or randomly fade, be omitted, be made more complex, or made more obscure.

Various program features and options may gradually become unavailable for use by the user. For example, a drawing package that allows a user to draw lines, circles, polygons, stars, and spirals, may one day make the "circle drawing" option unavailable and on another day make the "polygon drawing" option unavailable. Display quality (such as spatial resolution, color resolution, and refresh rate) may degrade through time. Sound quality may degrade through time and/or the volume may diminish through time. Processing speed may degrade so that, for example, a task that takes a certain amount of time one day takes may take more time the next day.

Network bandwidth speeds may degrade, which would be particularly relevant to software that requires use of a network like the Internet. Unpleasant visual, auditory, olfactory, and tactile stimulus may be produced. For example, watermarks may be superimposed on an application's display window and become progressively more opaque.

The system may make graphics blink unpleasantly or present unpleasant photographs, sounds, and odors. Information may degrade. For example, for text, some letters are progressively omitted, words are progressively omitted. For applications with sound, segments of sound are progressively omitted. All of these examples of degradation can happen in a random manner as well as a gradual, progressive manner. The purpose of the degradation is to induce users to buy the product software.

FIG. 1 illustrates an example of this invention. Inside of the computer system 100 there is the program 106. This is a software product that the user 107 received as a demo version. This program was received by the user from the store 101. A "store" may be physical or electronic (e.g. a web site). The program received by the user has a time constrains 104 on how long the program will exist in its original form. For instance, the program may be valid for one month. At the same time, user 107 receives another program-transformator 103, that constantly compares the time constrains 104 with the timer inside of the computer 105. Note, that program-transformator 103 may be part of program 106 and also may reside on a remote computer. If the transformator 103 resides on a remote computer 108 degradation signals may be sent to computer system 100 over network 106. A degradation service provider 109 may control transformator 103. After some time, the program-transformator starts changing the demo program. For example, the program-transformator starts to degrade certain elements or functionality of the demo program. The detailed description of how the program changes is shown in FIG. 2.

Figure 2:
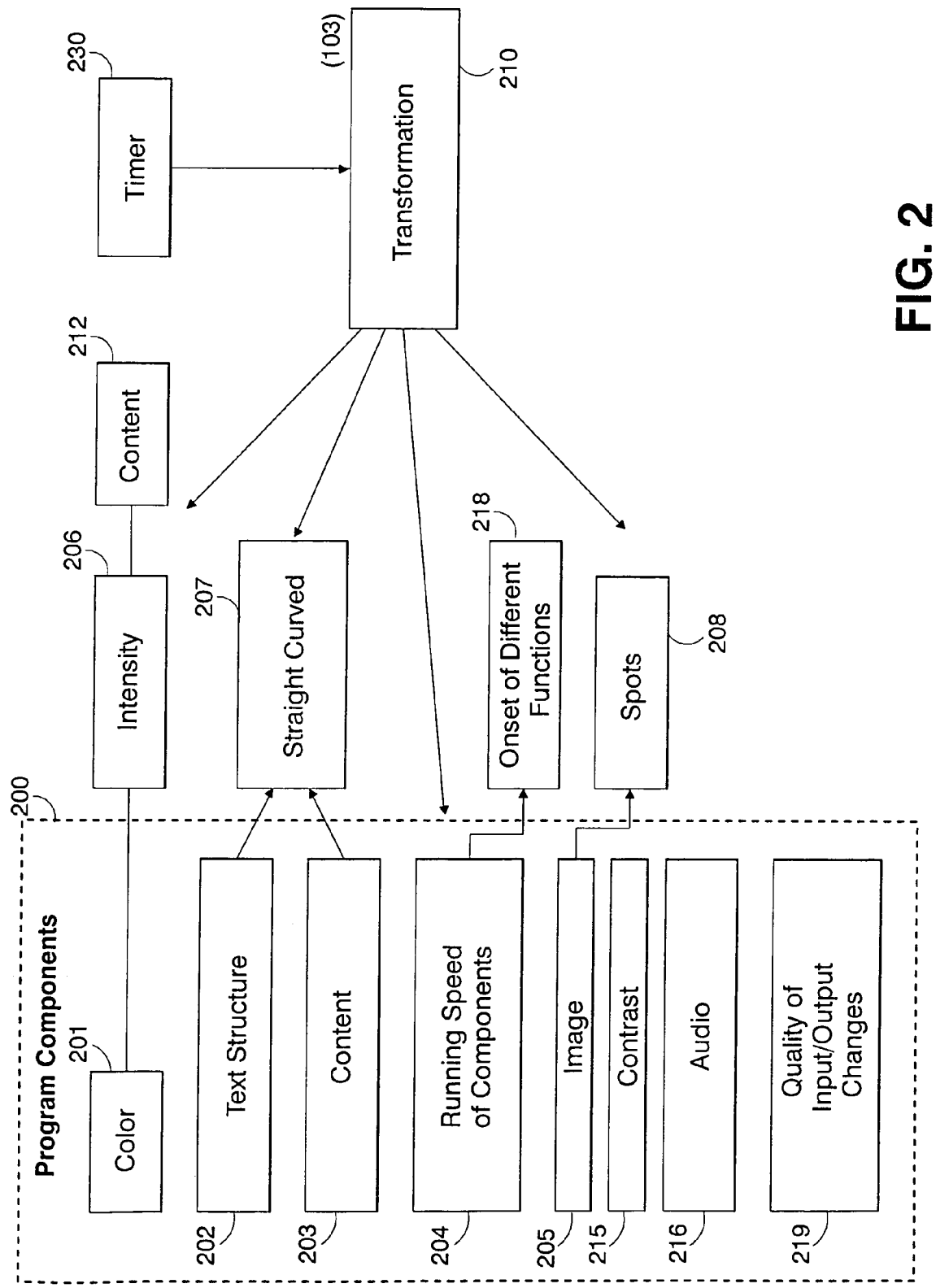
FIG. 2 describes how components of a software program may change.

FIG. 2 describes how the components of a program may change. 200 shows all the components of the program that are changing. The change of "color" includes intensity, saturation, hue, resolution, etc. Intensity 206 of content 212 becomes less intense, less bright, content is less visible. 202 show the text structure changing. For example, fonts begin to change, they become smaller, less readable, fonts shape become curved. The focus diminishes to make the text less readable. 203 shows the contour, edges of the different shapes on the screen. This contour becomes less visible and less usable to make the program less useful. 204 shows the speed of the performance of the different components of the software program. Certain functions are not set.

The performance could be changing in different directions, such as changing so fast that the user cannot follow, or vice versa is so slow that user is frustrated because of the time it takes to perform certain operations. 205 shows the image component of this program. The images that the user can see on the screen are degraded. For example, some distortion or spots may appear that will distort the image. 215 represents that the contrast of the image that can change. In step 216 audio-quality of audio degrades. 219 affects the quality of input and output. All these changes are managed by the timer 230. Timer controls the transformator 210 that is 103 on FIG. 1. The transformator 210 changes the features described above (color, texture, speed etc.) depending on the timer 230. Every component depends on the timer and changes as the time progresses.

Figure 3:
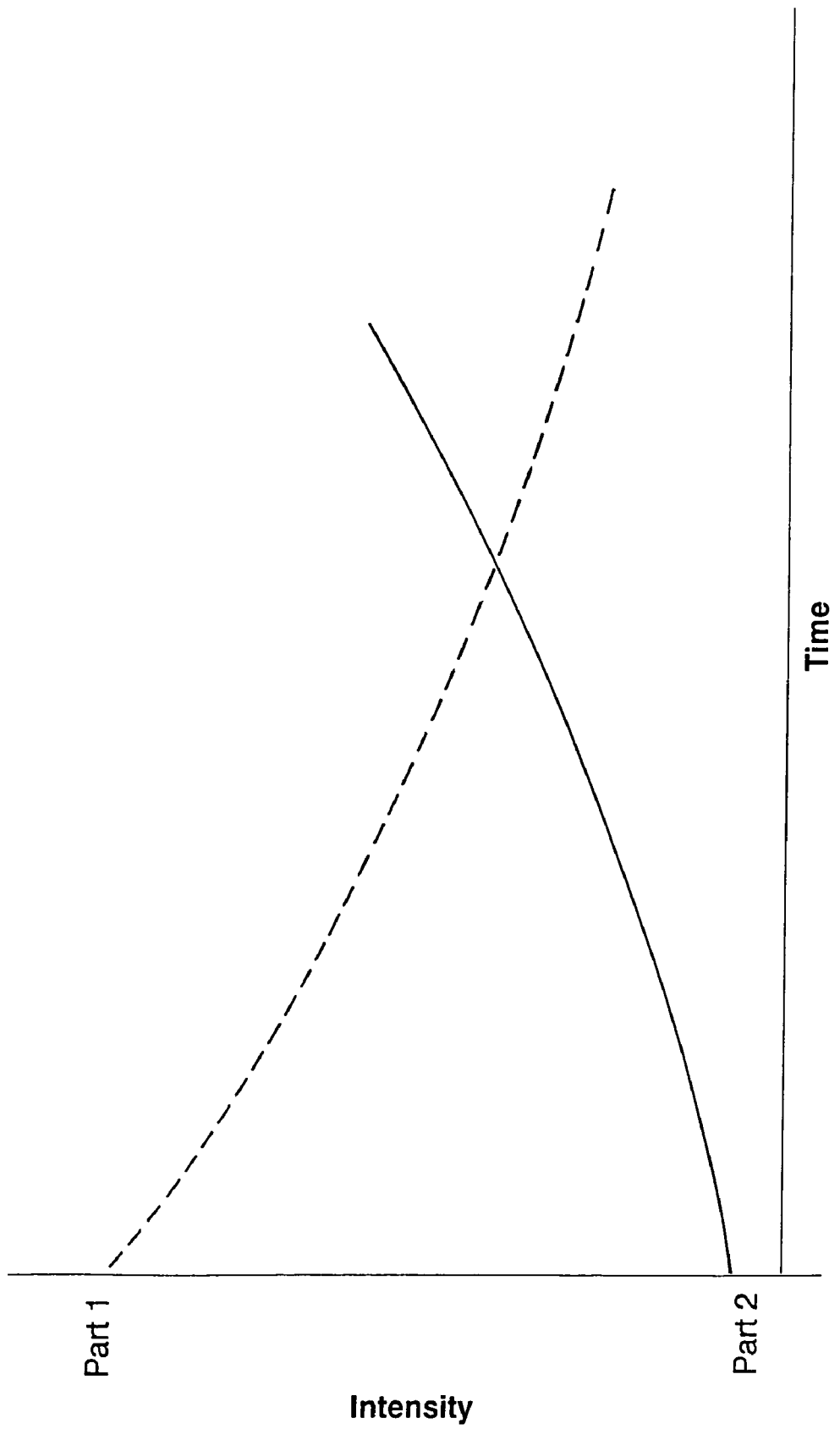
FIG. 3 shows how the intensity of a program can change.

FIG. 3 shows an example of how the intensity can be changed. In this example, the software program presents two pictures with different colors. The Figure shows a broken line, marked by "part 1", as one color or intensity, and a solid line, "part 2", as a different color or intensity. The program contains a table that shows the dependencies on timer as to how to change the intensity. As the time progresses, the intensities of these two lines change. For example, at sometime the intensity of part 2 (FIG. 3) becomes brighter then the intensity of part 1, which makes it difficult for the user to observe the screen.

Figure 4:
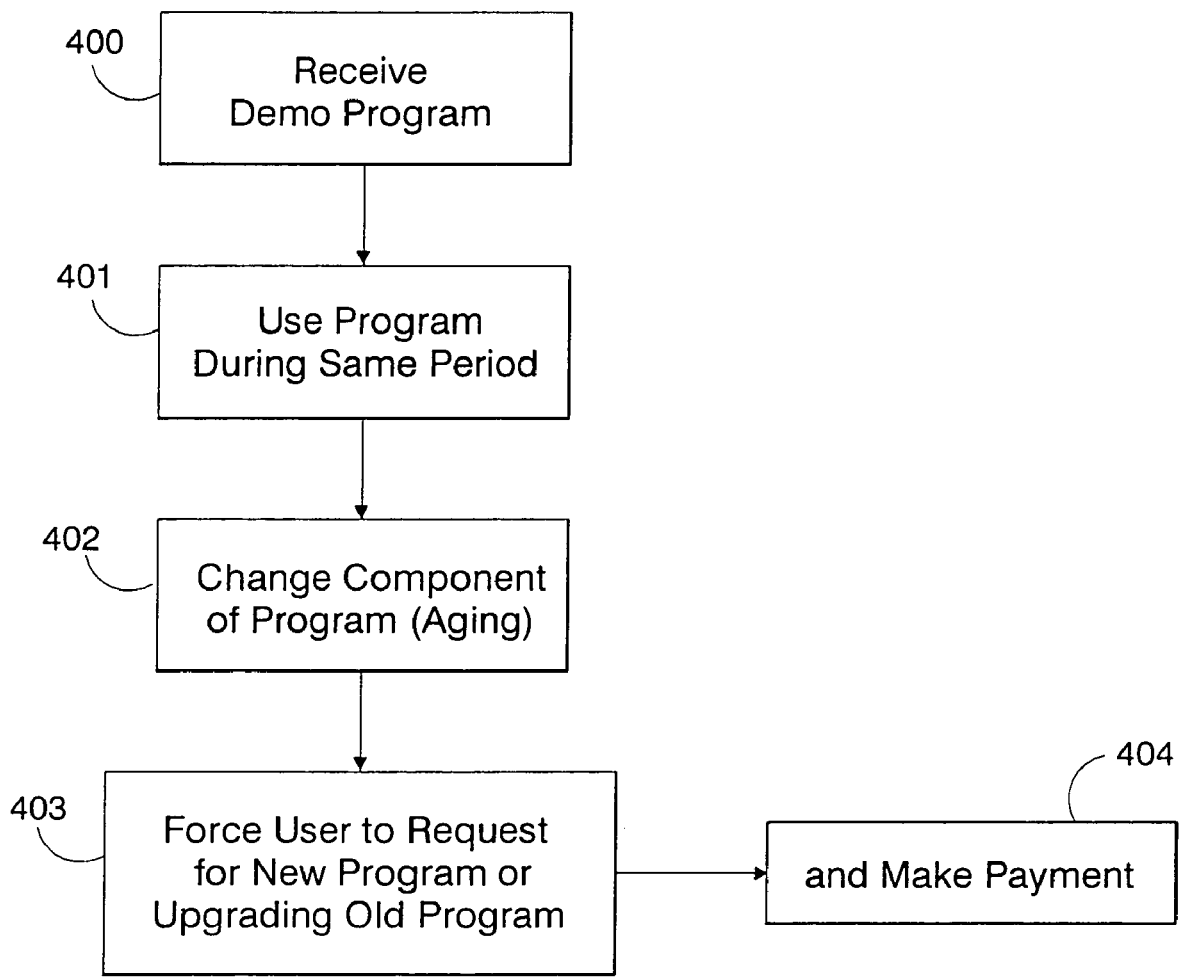
FIG. 4 is a flow chart of a preferred embodiment of this invention.

FIG. 4 shows the flow chart of the business model of how to use this approach. In this model, at 400, a user receives the demo program. He can use this program for some time period 401. After this evaluation time, the user is required to purchase this program. If the user does not buy the license, some components start to change and the program ages and degrades 402. The degradation or lack of degradation may be controlled by the degradation server provider 109, particularly if the system 100 is attached to a network 106 or if a portion of program resides on remote computer 108. The color, text, speed degrade so it is difficult to use this program successfully. After some time period, use of the program is nearly impossible. This approach encourages the user to buy the program, instead of using the old program 403.

As a result, in order to use the program, the user is encouraged to purchase the license to remove the degraded features.

The present invention has a number of important advantages. For instance, the customer who is using the full program easily becomes used to the program, its functionality, program performance, etc. After a certain period of time, during which the user becomes comfortable with the program, the program slowly degrades. The user becomes frustrated with the degraded functionality and performance and, in frustration, the chances increase that the user will purchase the full program. The customer will get used to the program because he/she is using it every day. And when he observes the degradation, he will have a great incentive to buy the product.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A system running in a central processing unit for changing the appearance and performance generated by a specified application, said specified application being undegraded and having a set of complete functionalities, the system comprising:

a timer for measuring time; and means, responsive to the timer, to change, after receipt of the specified application by the central processing unit, the appearance or performance generated by the specified application according to a timed procedure to encourage a user of the application to abandon this specified application and to purchase a new version of the specified application, said means to change the appearance or performance of the specified application including means to eliminate said functionalities one at a time according to said timed procedure to provide the user with a continuous, but progressively diminishing, use of said specified application;

wherein the central processing unit is connected to a network to receive data therefrom over a bandwidth and the means to change the appearance or performance of the specified application includes means to degrade said network bandwidth.

2. The system as in claim 1 where changes are obtained by manipulating drives in a personal computer.

3. The system in claim 1 where users pay money or view advertisements reduce or eliminate degradation.

4. The system in claim 3 where money is paid to any of: software manufacturer, seller, third party, or degradation service provider.

5. The system in claim 4 where the amount of degradation is related to the amount of money paid.

6. A system according to claim 1, wherein the central processing unit has a processing speed, and the means to change the appearance or performance of the specified application includes means to degrade said processing speed.

7. A system according to claim 1, wherein the means to change the appearance or performance of the specified application includes means to produce tactile stimulus.

8. A system according to claim 1, wherein the means to change the appearance or performance of the specified application includes means to produce olfactory stimulus.

9. A method of operating a trial software application, said trial application being undegraded and associated with a defined full application, and said trial application having a set of complete functionalities said method comprising the steps of:

providing the trial application with a first set of instructions, embodied in a computer readable medium, for causing a computer to generate a main program; and providing the trial application with a second sea of instructions, embodied in the computer readable medium, for causing the computer to diminish, after receipt of the trial application by the computer, the performance of the main program over time and in accordance with a timed procedure in order to encourage a user of the computer to purchase said defined full application, said second set of instructions including means to eliminate said functionalities one at a time according to said timed procedure to provide the' user with a continuous, but progressively diminishing, use of said trail application;

wherein the computer has a central processing unit having a processing speed, and the step of providing the trial application with a second set of instructions includes the step of using said second set of instructions to diminish the performance of the main program by degrading said processing speed.

10. A method according to claim 9, wherein said subprogram begins to diminish the performance of the main program a defined period of time after the user begins to use the trial application.

11. A method according to claim 9, wherein the computer is connected to a network to receive data therefrom over a bandwidth, end the step of using said second set of instructions includes the step of using said second set of instructions to degrade said network bandwidth.

12. A method according to claim 9, wherein the step of using said second set of instructions includes the further step of using said second set of instructions to produce tactile stimulus.

13. A system for operating a trial software application on a computer, said trial application having a main program and being undegraded and associated with a defined full application, and said trial application having a set of complete functionalities said system comprising:

a timer for measuring time;

means for operating the main program to produce a defined performance;

means responsive to the timer for diminishing, after receipt of the trial application by the computer, the performance of the main program over time and in accordance with a timed procedure in order to encourage a user to purchase said defined full application, said means for diminishing the performance of the main program including means to eliminate said functionalities one at a time according to said timed procedure to provide a user of the computer with a continuous, but progressively diminishing use of said trial application;

wherein the computer is connected to a network to receive data therefrom over a bandwidth, and the means for diminishing the performance of the main program includes means to degrade said network bandwidth.

14. A system according to claim 13, wherein said means for diminishing included means to begin to diminish the performance of the main program a defined period of time after the user begins to use the trial application.

15. A system according to claim 14, wherein said means for diminishing includes means to diminish gradually the performance of the main program over a given time starting at the end of said defined period of time.

16. A system according to claim 13, wherein the computer includes a central processing unit having a processing speed, and the means for diminishing the performance of the main program includes means to degrade said processing speed.

17. A system according to claim 13, wherein the means for diminishing the performance of the main program includes means to produce tactile stimulus.

18. A system according to claim 13, wherein said means for diminishing the performance of the main program is loaded onto a degradation server provider, separate and remote from said computer, said degradation server provider is connected to said computer by a network, and said degradation server provider controls the diminishing of the trial application.

19. A program storage device readable by machine, tangibly embodying a program of instructions executable by the machine to perform method steps for encouraging a user to purchase a full version software application related to an undegraded trial version, said trial version having set of complete functionalities, said method steps comprising.

20. A program storage device according to claim 19, wherein the computer is connected to a network to receive data therefrom over a bandwidth, and the step of diminishing the performance of the trial version includes the step of degrading said network bandwidth.

21. A program storage device according to claim 19, wherein the computer includes n central processing unit having a processing speed, and the step of diminishing the performance of the trail version includes the step of degrading said processing speed.

22. A system running in a central processing unit for changing the appearance and performance generated by a specified application, said specified application being undegraded and having a set of complete functionalities, the system comprising:

a timer for measuring time; and means responsive to the timer, to gradually diminish, after receipt of a specified application by a central processing unit, the appearance or performance generated by the specified application, including means to produce tactile stimulus and means to produce unpleasant olfactory stimulus according to a timed procedure beginning at a defined period of time after use of the specified application, said diminished appearance or performance occurring over a period of given time, wherein a user is encouraged to abandon the specified application and to purchase a new version of the specified application, said means to gradually diminish said appearance or performance includes means to eliminate said functionalities one at a time according to said timed procedure to provide said user with a continuous, but progressively diminishing, use said specified application;

and wherein the central processing unit is connected to a network to receive data therefrom over a bandwidth and the means to diminish the appearance or performance of the specified application includes means to degrade said network bandwidth:

and wherein the central processing unit has a processing speed and the means to diminish the appearance or performance of the specified application includes means to degrade said processing speed.

* * * * *